United States Patent [19]

Klobucar et al.

[11] Patent Number: 4,898,929

[45] Date of Patent: Feb. 6, 1990

[54] ALKENYL PHENOXY POLYFLUOROALKOXYPHOSPHAZENE

[75] Inventors: W. Dirk Klobucar; Charles H. Kolich; Jeffrey T. Books, all of Baton Rouge, La.

[73] Assignee: Ethyl Corporation, Richmond, Va.

[21] Appl. No.: 265,991

[22] Filed: Nov. 2, 1988

[51] Int. Cl.$^4$ .................. C08G 79/02; C08F 6/02
[52] U.S. Cl. ........................ 528/399; 525/326.6; 525/354; 525/538; 528/398; 528/480
[58] Field of Search ............ 525/538, 326.6, 354; 528/398, 399, 480

[56] References Cited

U.S. PATENT DOCUMENTS

| | | | |
|---|---|---|---|
| 3,702,833 | 11/1972 | Rose et al. | 528/399 |
| 3,838,073 | 9/1974 | Rose et al. | 528/399 |
| 3,888,799 | 6/1975 | Rose et al. | 528/399 |
| 3,943,088 | 3/1976 | Kyker et al. | 528/398 |
| 3,945,966 | 3/1976 | Vicic et al. | 528/399 |
| 3,970,533 | 7/1976 | Kyker et al. | 528/399 |
| 3,972,841 | 8/1976 | Cheng et al. | 528/392 |
| 4,000,166 | 12/1976 | Witner et al. | 524/500 |
| 4,113,670 | 9/1978 | Dieck et al. | 521/95 |
| 4,116,785 | 9/1978 | Cheng | 522/162 |
| 4,179,555 | 12/1979 | Cheng et al. | 528/168 |

OTHER PUBLICATIONS

Reynard et al., Final Report, Army Mtls. and Mech. Res. Center, Contract No. DAAG46-73-C-0215, Mar. 1974, (53 total pages).

Primary Examiner—Harold D. Anderson
Assistant Examiner—T. Mosley
Attorney, Agent, or Firm—Richard J. Hammond

[57] ABSTRACT

Substantially linear organophosphazene polymers containing randomly distributed repeating units represented by the formulas:

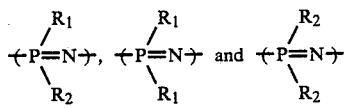

wherein $R_1$ is a fluoroalkoxy group having the structure:

$$F_3C-(CF_2)_n-CH_2O-$$

wherein n is 0 or an integer from 1 to 20 and X is fluorine and wherein at least 3 of the $R_1$ units are different from each other and $R_2$ represents a group with some unsaturation which enhances the curability of said polymers and represented by the formula:

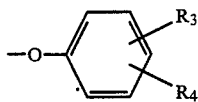

wherein $R_3$ is an unsaturated monovalent group and $R_4$ is selected from the group consisting of hydrogen, alkyl and alkoxy, the total number of said units ranging from 3 to about 100,000 and the $R_2$ groups being present in an amount sufficient to enable cure of said polymers and in the range of about 0.01–50 mole percent of the total number of $R_1$ and $R_2$ groups are claimed. The polymers possess excellent solvent and chemical resistance as well as low volume swell properties especially when contacted with petroleum based fuels such as gasoline and particularly when contacted with oxygenated fuels such as gasohol. This makes these materials highly useful as seals such as gaskets and o-rings, hoses, coatings and the like.

21 Claims, No Drawings

ALKENYL PHENOXY POLYFLUOROALKOXYPHOSPHAZENE

BACKGROUND OF THE INVENTION

This invention relates to a new and useful group of organophosphazene polymers. More specifically, this invention relates to a new and useful group of organophosphazene polymers consisting of substantially linear chains of alternating N and P atoms, which substituents on the P atoms include at least three different fluoroalkoxy groups (the groups —OCH$_2$CF$_3$, —OCH$_2$CF$_2$CF$_2$CF$_3$ and —OCH$_2$(CF$_2$)$_6$CF$_3$ being particularly preferred) and a fourth substituent containing some unsaturation to enhance the curability of the polymer, e.g. an alkenylaryloxy group such as ortho-allylphenoxy (OAP) or eugenoxy (i.e., 2-methoxy-4-allylphenoxy) being particularly preferred substituents.

The organophosphazene polymers of this invention are useful over a wide temperature range, possess excellent physical properties and exhibit outstanding stability to solvents, chemicals and water which makes them particularly useful in film and coating applications where high environmental resistance is desired. They also exhibit low volume swell when placed in contact with petroleum based fuels such as gasoline and oxygenated fuels, i.e., petroleum based fuels containing C$_1$ to C$_4$ alcohols such as gasohol. This renders them especially useful as hoses for the dispensing of petroleum based fuels and oxygenated fuels where excess swelling of the hose is undesirable and as seals such as gaskets and O-rings exposed to contact with such fuels.

Polyorganophosphazenes comprise a linear or cyclic chain of

units in which the P atom is substituted with two organo groups which may be the same or different. Typical organo substituents are phenoxy, alkylphenoxy, halophenoxy, alkoxyphenoxy, alkoxy, polyalkoxy, haloalkoxy, and the like. Typical polyaryloxyphosphazenes are disclosed in U.S. Pat. No. 3,853,794 and typical polyfluoroalkoxyphosphazenes are taught in U.S. Pat. No. 3,515,688. Mixed aryloxy-fluoroalkoxy substituted polyphosphazenes are disclosed in U.S. Pat. No. 3,700,629.

Rose et al. U.S. Pat. Nos. 3,702,833 and 3,888,799 disclose polyfluoroalkoxyphosphazenes containing unsaturated aliphatic groups such as allyloxy that can be cross-linked by peroxide curing agents which are resistant to a wide range of solvents, acids and bases. Rose et al. U.S. Pat. No. 3,838,073 disclose polyfluoroalkoxyphosphazene homopolymers in which each substituent bonded to the phosphorus atoms contain 4 to 12 carbon atoms and are fully fluorinated. They are plastics with exceptional solvent and chemical resistance and are useful as coatings and films.

Kyker et al. U.S. Pat No. 3,943,088 discloses the addition of fluoroalkoxyphosphazene oils to poly(fluoroalkoxyphosphazene) materials which are capable of being cured to improve their processibility, stress/strain properties and low temperature flexibility.

Vicic et al. U.S. Pat. No. 3,945,966 mention that polyfluoroalkoxyphosphazenes containing isoeugenoxy moieties (i.e., 2-methoxy-4-propenylphenoxy) may be peroxide cured. This appears to be based on the research described in Reynard et al. "Evaluation Poly(-Fluoroalkoxyphosphazene) Elastomers and Plastics," Final Report Contract No. DAAG46-73-C-0215, AMMRC CTR 74-18.

Kyker et al. U.S. 3,970,533 disclose polyfluoroalkoxyphosphazenes having some alkenylphenoxy substituents, especially ortho-allylphenoxy, which can be cured by peroxides, radiation or conventional sulfur vulcanization possessing outstanding solvent resistance, low temperature flexibility and good physical strength over a broad range of service conditions.

Cheng et al. U.S. Pat. No. 3,972,841 disclose polyphosphazene elastomers having improved low temperature properties containing non-fluorinated alkoxy groups and a small amount of unsaturated substituents on the phosphazene backbone to enhance curability.

Witner et al. U.S. Pat. No. 4,000,166 disclose phosphazene fluoroalkoxyelastomer compositions possessing enhanced processibility, low temperature flexibility and low volume swell in petroleum based hydraulic fluids consisting essentially of a fluoroalkoxyphosphazene in which all of the substituents attached to the P atoms are principally fluoroalkoxy groups and at least some unsaturated groups to effect curing and between about 1 and 20 parts of silicone gum rubber per 100 parts of fluoroelastomer blended therewith.

Dieck et al. U.S. Pat. No. 4,113,670 disclose polyaryloxyphosphazenes which have alkenylaryloxy groups (e.g., ortho-allylphenoxy, eugenoxy, etc.) which can be cured by peroxides or sulfur, and which can be used to form flexible and semirigid foams and coatings displaying good fire retardance and low smoke levels.

Cheng U.S. Pat. No. 4,116,785 discloses certain non-fluorinated alkoxy and/or aryloxy-substituted polyphosphazenes possessing outstanding low temperature flexibility and good physical strength over a broad range of service conditions which also contain olefinic substituents such as ortho-allylphenoxy groups which can be cured by conventional sulfur vulcanization or by radiation.

Cheng et al. U.S. Pat. No. 4,179,555 disclose oil-free poly(aryloxyphosphazene) copolymers containing residual amounts of P-Cl bonds which produce elastomeric characteristics in the copolymers in the absence of relatively low molecular weight polyphosphazene oils which are normally required to impart such characteristics and minor proportions of randomly distributed units containing reactive sites enabling the properties of the copolymers to be modified by cross-linking and/or curing. The copolymers may be utilized in various applications such as foams and coatings, and are particularly suited for use in wire coating formulations.

Klobucar U.S. Ser. No. 072,296now U.S. Pat. No. 4,849,494 discloses cured polyfluoroalkoxyphosphazene elastomers made from eugenoxy-substituted cyclic or linear polyfluoroalkoxyphosphazenes which possess superior physical properties compared to conventional cured elastomers made from ortho-allylphenoxy substituted polyfluoroalkoxyphosphazenes.

SUMMARY OF THE INVENTION

In accordance with the invention, there are now provided new and useful organophosphazene polymers having good solvent resistance and volume swell properties consisting of substantially linear chains of alternating N and P atoms, which substituents on the P atoms include at least three different fluoroalkoxy groups (the groups —OCH$_2$CF$_3$, —OCH$_2$CF$_2$CF$_2$CF$_3$ and —OCH$_2$(CF$_2$)$_6$CF$_3$ being particularly preferred) and a fourth substituent containing some unsaturation to enhance the curability of the polymers such as an alkenylaryloxy group, e.g. orthoallylphenoxy (OAP) or eugenoxy (i.e., 2-methoxy-4-allylphenoxy) being particularly preferred to facilitate the curability of the polymers.

DESCRIPTION OF THE PREFERRED EMBODIMENTS

Thus, a preferred embodiment of the invention is a substantially linear organophosphazene polymer containing randomly distributed repeating units represented by the formulas:

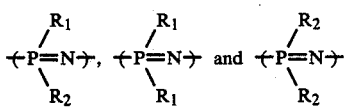

wherein R$_1$ is a fluoroalkoxy group having the structure:

F$_3$C—(CF$_2$)$_n$—CH$_2$O— wherein n is 0 or an integer from 1 to 20 and wherein at least 3 of the R$_1$ units are different from each other and R$_2$ represents a group with some unsaturation which enhances the curability of said polymers and represented by the formula:

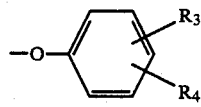

wherein R$_3$ is an unsaturated monovalent group and R$_4$ is selected from the group consisting of hydrogen, alkyl and alkoxy, the total number of said units ranging from 3 to about 100,000 and the R$_2$ groups being present in an amount sufficient to enhance the curability of said polymers and in the range of about 0.01–50 mole percent of the total number of R$_1$ and R$_2$ groups.

The uncured polyphosphazene is substantially linear. The number of

units in the linear polyphosphazene can be from about 3 up to 100,000 or more and the preferred range is about 20–75,000 and a more preferred range is about 100–50,000.

Each phosphorus atom in the —P=N— chain of the linear polyphosphazene is substituted with two organo groups. One type of substituent, designated R$_1$, are fluoroalkoxy groups. This class includes any alkoxy groups having fluorine substituents. The preferred fluoroalkoxy groups have a structure —F$_3$C—(CF$_2$)$_n$—CH$_2$O—     (I)

wherein n is 0 or an integer from 1 to 20. More preferably, n is 0 or an integer from 1 to 13. Still more preferably n will have a value of 0 to 9. The value of n need not be the same on each fluoroalkoxy substituent because the substituents on the P atoms must include at least 3 different fluoroalkoxy groups.

In a highly preferred case, about 5–95 mole percent of the fluoroalkoxy groups are 2,2,2-trifluoroethoxy groups and the remaining 95-5 mole percent of the fluoroalkoxy groups are a mixture of fluoroalkoxy groups having the structure F$_3$C—(CF$_2$)$_m$—CH$_2$O—     (II)

wherein m is an integer from 1 to 20.

In a still more preferred case, 55–75 mole percent of the fluoroalkoxy groups are trifluoroethoxy groups and the remaining fluoroalkoxy groups have the above structure II in which m is in the range of 1 to 13.

An essential feature of the invention is the presence of unsaturated substituent groups on the phosphazene backbone which are bonded to the phosphorus atom in the polymer chain to enhance curability such as allylaryloxy, crotylaryloxy, eugenoxy and others which have unsaturation in the side chain, such substituents being represented by the general formula:

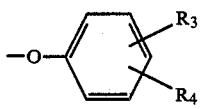

wherein R$_3$ includes some unsaturation, e.g., an alkenyl group such as vinyl, allyl, crotyl or the like and R$_4$ is selected from the group consisting of hydrogen, alkyl (C$_1$–C$_4$) or alkoxy (C$_1$–C$_4$) Especially preferred substituents are o-allylphenoxy and eugenoxy. The number of such groups per molecule should be at least two and preferably an amount that gives the desired degree of cure (i.e., cross-linking) on treatment with a curing agent such as a peroxide or sulfur. In the case of the high molecular weight linear polyphosphazenes where the number of phosphorus atoms in the backbone is high, the mole percent of such substituents based on the total substituents need not be particularly high in order to provide the desired degree of cure. A useful range of such substituents is about 0.01 to 50 mole percent. The preferred range is about 0.01–20 mole percent and more preferably about 0.05–15 mole percent and most preferably about 0.1–5 mole percent.

The polyorganophosphazenes are readily made by first reacting ammonium chloride with phosphorus pentachloride in monochlorobenzene solvent at 120°–130° C. to form a mixture of cyclic and low molecular Weight linear chlorophosphazenes. These can be recovered by removing the solvent and the cyclics can be separated by crystallization or distillation or both.

High molecular weight linear polydichlorophosphazenes can be made by purifying the cyclics and then heating them under an inert atmosphere at about 180°–270° C. for 2-24 hours or more until the desired degree of polymerization has occurred. A small amount of a catalyst such as boron trichloride can be added to promote the polymerization. The polymerization mixture can then be dissolved in a solvent such as benzene, toluene or cyclohexane and this solution added to a non-solvent such as heptane which will cause the high molecular weight linear polydichlorophosphazenes to precipitate leaving the cyclic species in solution to be easily separated from the high molecular weight linear polydichlorophosphazenes.

The polydichlorophosphazene then can be substituted with the desired organo substituents by dissolving it in a solvent such as THF, toluene or cyclohexane and adding the solution to a THF solution of an alkali metal salt of a suitable alcohol such as the sodium salt of eugenol and at least three different fluoroalcohols in any order. Preferably, the solution of polydichlorophosphazene is first reacted with the solution of sodium eugenoxide to introduce the desired amount of eugenoxy substituents and this mixture is then reacted with a THF solution of at least three different sodium fluoroalkoxides to complete the substitution. The resultant mixture is then neutralized with concentrated sulfuric acid and poured into water. The precipitated polymer is separated and dissolved in a mixture of 90 volume percent 1,1,2-trichlorotrifluoroethane/10 volume percent acetone. The solution is then washed with water to remove residual salt. The polymer is recovered by addition of the organic phase to an excess of heptane to precipitate the elastomeric product. These polymers are substantially linear, high molecular weight materials and are completely substituted.

The polyfluoroalkoxyphosphazene is generally compounded with other conventional ingredients prior to curing. These include fillers (e.g., alumina trihydrate, magnesia, silica, carbon black, and the like), processing aids (e.g., stearic acid, zinc oxide, zinc stearate and the like), plasticizers (e.g., organophosphazene oil, naphthenic oil and the like), pigments, stabilizers, antioxidants and the like. If the polymer is to be made into a foam, a blowing agent can be added such as azobisisobutyronitrile.

A curing agent is blended into the compound. Peroxide or other free-radical generating agents work quite well. Examples of these are benzoylperoxide, 2,5-dimethyl-2,5-di(tert-butyl-peroxy)hexane, bis(4-chlorobenzoyl)peroxide; 1,1-bis(t-butyl-peroxy)-3,5,5-trimethylcyclohexane, tert-butyl perbenzoate, dicumyl peroxide; $\alpha,\alpha'$-bis(tert-butylperoxy)diisopropylbenzene and the like. They are used at concentrations of about 0.1–10 parts per 100 (pph) of polyorganophosphazene. Alternatively, sulphur vulcanizing systems may be used. Such systems are well known. Typical phosphazene vulcanizing systems are described in Cheng U.S. Pat. No. 4,116,785. They include about 0.25–5 pph of sulfur based on the polymer content of the compound together with accelerators such as zinc dimethyldithiocarbamate and/or mercaptobenzothiazole.

Phosphazenes can also be cured by chemical agents having at least 2 reactive sites. For example, polyhydrosiloxanes in the presence of a platinum catalyst will cross-link polyorgano-phosphazenes through a siloxane bridge.

The polymers of this invention can be used to form films, coatings and the like by known coating, spraying or molding techniques. They can also be used to form hoses, seals such as gaskets or o-rings, damping compositions, adhesives, foams and other shaped articles. The polymers are insoluble in all common solvents such as water, acetone, alcohols, benzene, hexane, chloroform, ethylacetate and tetrahydrofuan. They are unaffected by immersion in cold concentrated sulfuric acid, cold 40% aqueous potassium hydroxide and in boiling water.

The polymers of this invention are particularly suited for use as seals such as gaskets and o-rings which come into contact with both petroleum based hydrocarbon fuels and oxygenated fuels where slight swelling is advantageous, i.e., swelling not exceeding approximately 25% by volume of the initial volume of the seal or gasket in order to provide a tight seal.

The invention is illustrated by the following examples which are not intended to limit the invention.

EXAMPLE 1

To a glass reaction vessel was added 420 grams of a tetrahydrofuran solution of sodium trifluoroethoxide (1120 meq), 270 grams of a tetrahydrofuran solution of sodium heptafluorobutoxide (389 meq), 115.9 grams of a tetrahydrofuran solution of $C_7F_{15}CH_2OH$ (0.183 mol) and 4.07 grams of sodium metal (0.177g-atom). The reaction mixture was stirred 24 hours at 60° C. To a second glass vessel was added 785 grams of a cyclohexane solution of polydichlorophosphazene (90.2 grams, 1557 meq chloride) followed by 191.95 grams of a tetrahydrofuran solution of sodium eugenoxide (7.8 meq). The reaction mixture was stirred for 20 minutes at room temperature. The second solution was added to the first over 22 minutes at 60°–67° C. The mixture was stirred for 30 minutes at 60° C. and then transferred to a stainless steel pressure vessel and heated at 136° C. for 11 hours. After cooling to room temperature, the reactor was emptied and rinsed with 852 grams of tetrahydrofuran. Concentrated sulfuric acid (7.1 grams) and deionized water (10 liters) were added to the reaction mixture. The precipitated gum was collected and allowed to dry overnight. The gum was combined with a gum from a second identical run and dried for 4 hours at 75° C. and >30 in Hg vacuum. The gum (543 grams) was dissolved in 6.0 liters of 90/10 (volume %/volume %) 1,1,2-trichlorotrifluoroethane/acetone. The solution was washed twice with 2.0 liters of deionized water. The organic phase was pumped through a 90 micron filter into 12 liters of heptane. The precipitated gum was collected and allowed to dry overnight in a hood. The gum was brought to constant weight at 73° C. and >30 in Hg vacuum. There was obtained 369 grams of beige gum.

The following analysis was obtained for the gum.

| | |
|---|---|
| Eugenoxy Content | 0.2 weight percent |
| Total Chloride | 0.056 weight percent |
| Intrinsic Viscosity - 90/10 (V/V) 1,1,2-trichlorotrifluoroethane/acetone, 25° C. | 1.58 dl/gram |
| Glass Transition Temp. (Tg) | −61° C. |
| Sodium Content | 65 ppm |

The following formulation (Formulation A) was prepared containing the eugenoxy substituted polyfluoroalkoxyphosphazene of Example 1 and tests were conducted to measure the physical properties of the formulation. In particular, 50 percent modulus, tensile strength, and compression set and elongation were measured.

Tensile properties were obtained following ASTM D 412-83, Method B (Standard Test Methods for Rubber Properties in Tension). The term "modulus" is used following common usage to refer to tensile stress at a given relative elongation. English units (psi) have been used.

In the same tensile strength test, elongation at breaking point was also measured both before and after heat aging of the test specimens. Elongation properties are reported as the percent retention of initial elongation. Higher values are preferred.

Compression set measurements were obtained following ASTM D 395-78 (Standard Test Methods for Rubber Property-Compression Set) using Method B (constant deflection). A molded Type 1 specimen (0.5" thick) was used and compressed 25% under the conditions noted. Smaller compression set values indicate less retention of the test compression conditions and are improvements.

Higher module values are preferred in many applications particularly in seals and gaskets. Higher tensile strengths are always preferred.

Formulation A contained 85 grams of gum prepared from Example 1, 2.5 grams of stabilizer, 10.2 grams of carbon black, 23.8 grams of inorganic filler, 0.21 gram of silane modifier, 0.85 gram of organic fibrous filler and 0.68 gram peroxide curing agent [40% active α,α'-bis(-tert-butylperoxy)diisopropylbenzene on clay, (Vul-Cup 40KE, Hercules, Inc.]. The formulated gum was cured for 30 minutes (50 minutes for compression set buttons) at 171° C. and then post-cured 4 hours at 177° C. Fifty percent modulus was measured initially and tensile strength was measured initially and after aging at specified time and temperature. Compression set was measured after compressing the test specimen for a specified time at a specified temperature.

For comparative purposes, an identical formulation (Formulation B) was prepared except that instead of containing 0.68 gram of peroxide curing agent, 0.85 gram of the same curing agent was used and instead of containing 85 grams of the gum from Example 1, it contained a commercially available substantially linear, high molecular weight polyfluoroalkoxyphosphazene terpolymer consisting of a substantially linear chain of alternating N and P atoms, in which substituents on the P atoms included o-allyl phenoxy, OCH$_2$CF$_3$ and HF$_2$C—(CF$_2$)$_m$—CH$_2$O groups in which m had a value of 1–13 averaging about 5. The following Table 1 gives the test results.

TABLE 1

|  | Formulation A | Formulation B |
|---|---|---|
| 50% Modulus (psi) | 540 | 400 |
| Compression Set (%) after 70 hrs at 149° C. | 21 | 28 |
| Tensile Strength (psi) Initial | 1490 | 1670 |
| Tensile Strength (psi) After 70 hrs at 200° C. | 1120 | 1160 |
| Ultimate Elongation (%) | 95 | 120 |
| Ultimate Elongation after 70 hours at 200° (% retained) | 100 | 141 |

In the above tests, the 50% modulus of Formulation A was substantially higher than that of Formulation B.

Compression set is an especially important property for elastomers used in gaskets and seals. Formulation A, containing the polyphosphazene gum of the invention) showed a distinct advantage over the Formulation B elastomer making it especially useful in the fabrication of seals such as gaskets and o-rings.

Both Formulation A and Formulation B had good initial tensile strengths. However, Formulation B underwent more tensile strength degradation than Formulation A in extended heat aging.

Further tests were conducted to determine the percent of volume swell of the Formulation A and Formulation B compositions following ASTM D-471 (Standard Test Method for Rubber Property-Effect of Liquids) using molded specimens 80 mils thick, 1.0" in width and 1.0" in length. Volumes were measured both initially and after a 70 hr immersion period in 85/15 ASTM Fuel C/methanol at reflux. ASTM Fuel C is a 50/50 blend of isooctane/toluene. In general, in order for elastomers to be useful in the fabrication and use of seals such as gaskets and o-rings, it is desirable that the elastomer nor exhibit a volume swell of more than 25% when contacted with petroleum based fuel such as gasoline or oxygenated fuels such as gasohol. Test results showed that the composition of Formulation A experienced only a 13 percent volume swell whereas the composition of Formulation B suffered a percent volume swell of 56% showing the composition of Formulation A to be far superior to Formulation B in volume swell properties.

Similarly immersed in pure methanol for 70 hours, Formulation A increased in volume only 13% while Formulation B increased 172%.

We claim:

1. A Substantially linear organophosphazene polymer containing randomly distributed repeating units represented by the formulas:

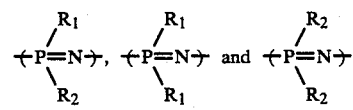

wherein R$_1$ is a fluoroalkoxy group having the structure:

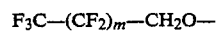

wherein m is 0 or an integer from 1 to 20 and wherein at least 3 of the R$_1$ units are different from each other and R$_2$ represents a group with some alkenyl group unsaturation which enhances the curability of said polymers and represented by the formula:

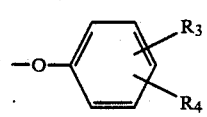

wherein R$_3$ is an alkenyl monovalent group and R$_4$ is selected from the group consisting of H, alkyl and alkoxy, the total number of said units ranging from 3 to about 100,000 and the R$_2$ groups being present in an amount sufficient to enable the cure of said polymers and in the range of about 0.01–50 mole percent of the total number of R$_1$ and R$_2$ groups.

2. A phosphazene polymer of claim 1 containing about 100–50,000 of said units and wherein said R$_2$ groups are present in an amount of about 0.01–20 mole percent of the total number of R$_1$ and R$_2$ groups.

3. The phosphazene polymers of claim 2 wherein said R$_1$ fluoroalkoxy groups are about 5–95 mole percent 2,2,2-tri fluoroethoxy groups and about 95–5 mole percent of groups having the structure

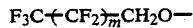

wherein m is an integer from 1 to about 13.

4. A phosphazene polymer of claim 1 wherein $R_3$ is an allyl group.

5. A phosphazene elastomer made by curing a phosphazene polymer of claim 1.

6. A phosphazene elastomer of claim 5 wherein said curing is by sulfur vulcanization.

7. A phosphazene elastomer of claim 5 wherein said curing is by free-radical catalyzed cross-linking.

8. A phosphazene elastomer made by curing a phosphazene polymer of claim 2.

9. A phosphazene elastomer made by curing a phosphazene polymer of claim 3

10. A phosphazene elastomer made by curing a phosphazene polymer of claim 4.

11. A phosphazene elastomer of claim 5 further characterized by containing 1 or more fillers.

12. A phosphazene elastomer of claim 6 further characterized by containing 1 or more fillers.

13. A phosphazene elastomer of claim 7 further characterized by containing 1 or more fillers.

14. A phosphazene elastomer of claim 8 further characterized by containing 1 or more fillers.

15. A phosphazene elastomer of claim 9 further characterized by containing 1 or more fillers.

16. A phosphazene elastomer of claim 10 further characterized by containing 1 or more fillers.

17. A film made from a phosphazene elastomer of claim 5.

18. A coating including a phosphazene elastomer of claim 5.

19. A seal made from a phosphazene elastomer of claim 5.

20. A gaskets made from a phosphazene elastomer of claim 5.

21. An o-ring made from a phosphazene elastomer of claim 5.

* * * * *